US011441625B1

(12) United States Patent
Lee

(10) Patent No.: US 11,441,625 B1
(45) Date of Patent: Sep. 13, 2022

(54) PERIODIC-WAVE DISC BRAKE ROTOR

(71) Applicant: United States of America as represented by the Administrator of NASA, Washington, DC (US)

(72) Inventor: Jonathan A. Lee, Madison, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 164 days.

(21) Appl. No.: 16/904,224

(22) Filed: Jun. 17, 2020

(51) Int. Cl.
*F16D 65/12* (2006.01)
*F16D 65/02* (2006.01)

(52) U.S. Cl.
CPC ......... *F16D 65/128* (2013.01); *F16D 65/127* (2013.01); *F16D 2065/1304* (2013.01)

(58) Field of Classification Search
CPC ................. F16D 65/12; F16D 65/123–127
USPC .......................................... 188/18 A, 218 XL
See application file for complete search history.

(56) References Cited

U.S. PATENT DOCUMENTS

| | | | |
|---|---|---|---|
| 6,386,340 B1 | 5/2002 | Milesi et al. | |
| 7,097,007 B2 | 8/2006 | Lin | |
| 7,284,643 B1 | 10/2007 | Kao | |
| 7,331,433 B2 | 2/2008 | Okabe | |
| D661,633 S | 6/2012 | Shinagawa | |
| 8,297,416 B2 | 10/2012 | Kitchell | |
| 8,430,215 B2 | 4/2013 | Mikura | |
| 8,631,915 B2 | 1/2014 | Rosenlocher et al. | |
| 8,851,245 B2 | 10/2014 | Bielis, IV et al. | |
| 9,234,553 B2 | 1/2016 | Iwai et al. | |
| D784,873 S | 4/2017 | Kobayashi et al. | |
| D832,166 S | 10/2018 | Kobayashi et al. | |
| 10,711,857 B2 * | 7/2020 | Nagai | F16D 65/125 |
| 2004/0200674 A1 | 10/2004 | Campbell | |
| 2005/0056495 A1 | 3/2005 | Greppi | |
| 2017/0284489 A1 * | 10/2017 | Taniguchi | F16D 65/123 |
| 2019/0145474 A1 * | 5/2019 | Doerne | C23C 8/36 |
| | | | 188/218 XL |

FOREIGN PATENT DOCUMENTS

| | | | | |
|---|---|---|---|---|
| EP | 0971147 B1 | 10/2003 | | |
| GB | 2369660 A | * | 6/2002 | ................ B62L 3/00 |

* cited by examiner

*Primary Examiner* — Christopher P Schwartz
(74) *Attorney, Agent, or Firm* — Jacob A. Heafner; Jerry L. Seemann; Helen M. Galus

(57) ABSTRACT

A disc brake rotor includes an annular portion having a first surface and a second surface in opposition to the first surface. The first surface and second surface traverse a periodic wave. An inner radial edge of the annular portion traverses an inner periodic wave and an outer radial edge of the annular portion traverses an outer periodic wave. A pattern and a period are the same for the periodic wave, the inner periodic wave, and the outer periodic wave. Thermal radiation elements are coupled to portions of at least one of the inner radial edge and the outer radial edge.

16 Claims, 5 Drawing Sheets

PERIODIC-WAVE DISC BRAKE ROTOR

ORIGIN OF THE INVENTION

The invention described herein was made by an employee of the United States Government and may be manufactured and used by or for the Government of the United States of America for governmental purposes without the payment of any royalties thereon or therefore.

BACKGROUND OF THE INVENTION

1. Field of the Invention

This invention relates to disc brake rotors. More specifically, the invention is disc brake rotor whose braking surfaces traverse a periodic wave.

2. Description of the Related Art

Disc brake rotors include opposing axial surfaces that are engaged by a brake caliper during braking as is well known in the art. A disc brake rotor can be mounted at a wheel's hub or the perimeter of a wheel. Both types generate substantial heat during a braking operation that requires dissipation for brake efficiency and longevity. In addition, the weight of a perimeter-mounted disc brake rotor can be substantially more than a hub-mounted disc brake rotor since a perimeter disc brake rotor has a much larger diameter. The increased weight requires additional energy to rotate a wheel having a perimeter disc brake rotor coupled thereto.

SUMMARY OF THE INVENTION

Accordingly, it is an object of the present invention to provide disc brake rotor having improved heat dissipation.

Another object of the present invention is to provide a disc brake rotor that includes weight reducing features.

Still another object of the present invention is to provide a perimeter brake rotor having heat dissipation and weight reducing features.

Other objects and advantages of the present invention will become more obvious hereinafter in the specification and drawings.

In accordance with the present invention, a disc brake rotor includes an annular portion having a first surface and a second surface in opposition to the first surface. The annular portion has an axial thickness T between the first surface and the second surface. The first surface and the second surface traverse a periodic wave wherein an inner radial edge of the annular portion traverses an inner periodic wave and an outer radial edge of the annular portion traverses an outer periodic wave. A pattern and a period are the same for the periodic wave, the inner periodic wave, and the outer periodic wave. Thermal radiation elements are coupled to portions of at least one of the inner radial edge and the outer radial edge.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

Figure 11:
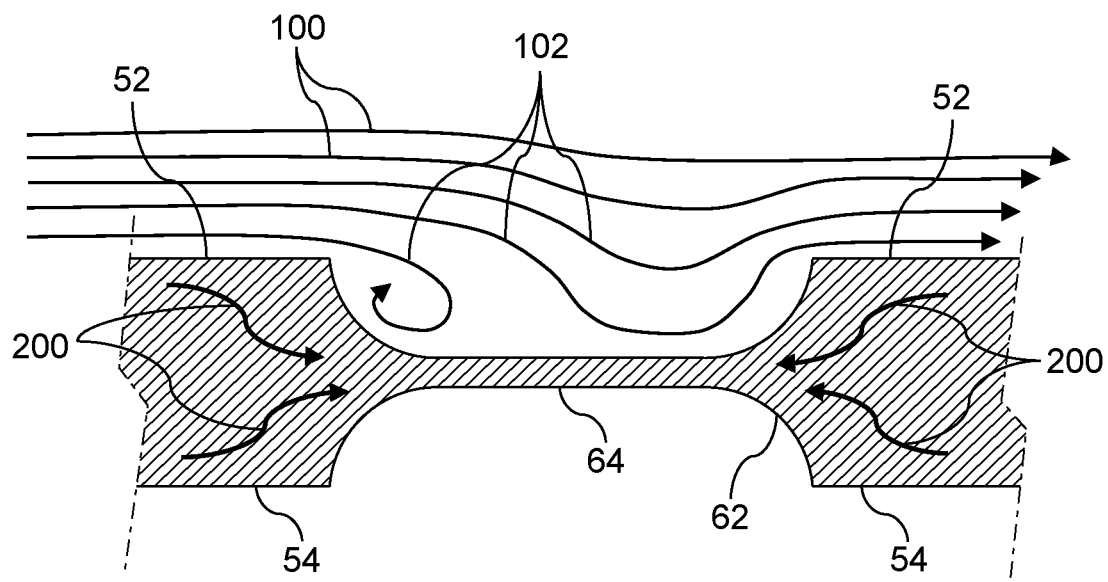
Figure 12:
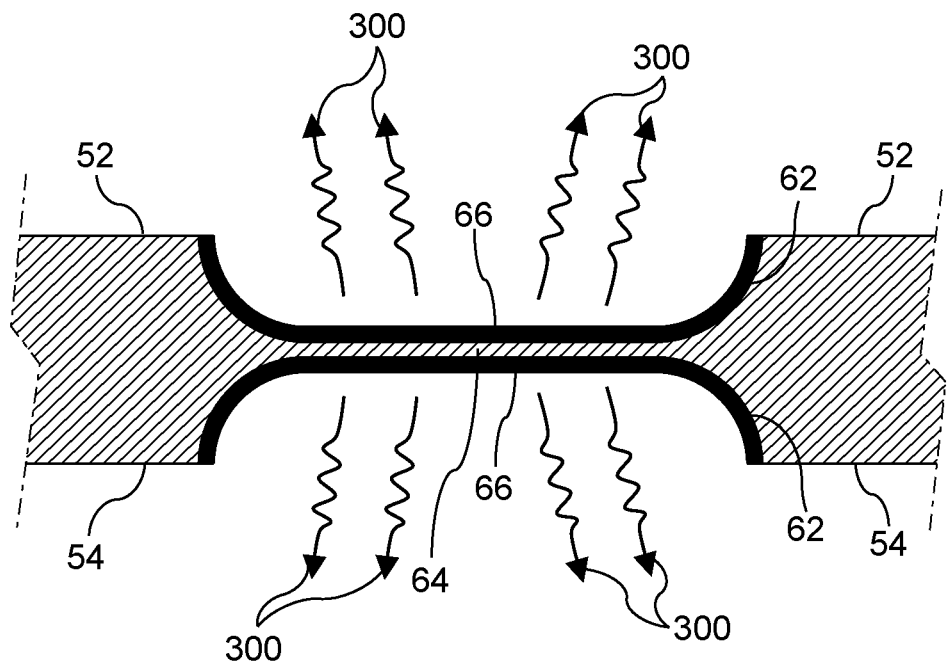

FIG. 11 is an isolated cross-sectional view of a dimpled region of a disc brake rotor illustrating the convective and conductive cooling effects provided thereby; and FIG. 12 is an isolated cross-sectional view of a dimpled region of a disc brake rotor where the surface of the dimple has been coated with a high thermal emissivity material in accordance with another embodiment of the present invention.

DESCRIPTION OF THE PREFERRED EMBODIMENT(S)

Referring now to the drawings, simultaneous reference will be made to FIGS. 1-3 where a disk brake rotor in accordance with an embodiment of the present invention is shown and is referenced generally by numeral 10 in FIG. 1. The novel features of the present invention that will be described for the non-limiting exemplary embodiments thereof can be applied to both hub-mounted and perimeter-mounted disc brake rotors. By way of non-limiting illustrative examples, the present invention will be explained herein for perimeter disc brake rotors. For simplicity of illustration and clarity of description, features of the present invention that facilitate its coupling to a wheel (not shown) or hub have been omitted as a variety of wheel (or hub) attachment schemes known in the art could be used without departing from the scope of the present invention.

Figure 1:
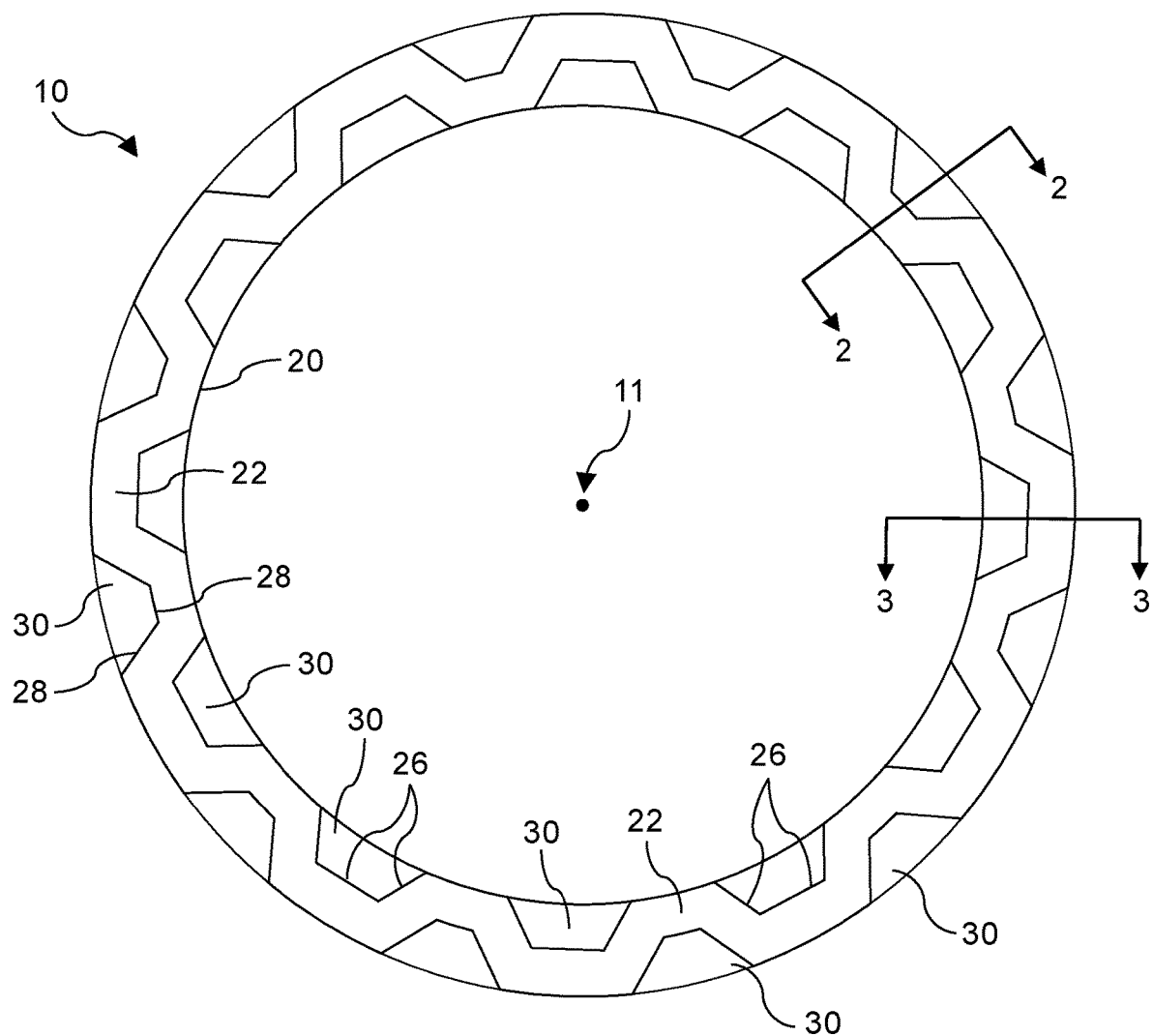
FIG. 1 is an axial end view of a periodic-wave disc brake rotor in accordance with an embodiment of the present invention.

FIG. 1 presents an axial end view of disc brake rotor 10 where the axis of rotation of rotor 10 is indicated by numeral 11. Rotor 10 includes an annular portion 20 that defines the braking surfaces of rotor 10 and a plurality of thermal radiation elements 30 coupled to annular portion 20. Annular portion 20 and thermal radiation elements 30 can be made as an integral or assembled structure without departing from the scope of the preset invention. Materials used to construct rotor 12 can include one or more of metals, composites, etc., known in the art of brake rotor construction without departing from the scope of the present invention.

Figure 2:
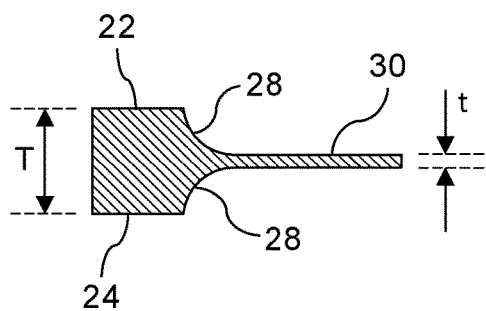
FIG. 2 is a radial cross-section of the disc brake rotor taken along line 2-2 in FIG. 1.
Figure 3:
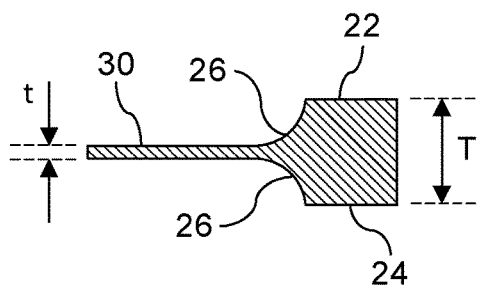
FIG. 3 is a radial cross-section of the disc brake rotor take along line 3-3 in FIG. 1.
Figure 4:
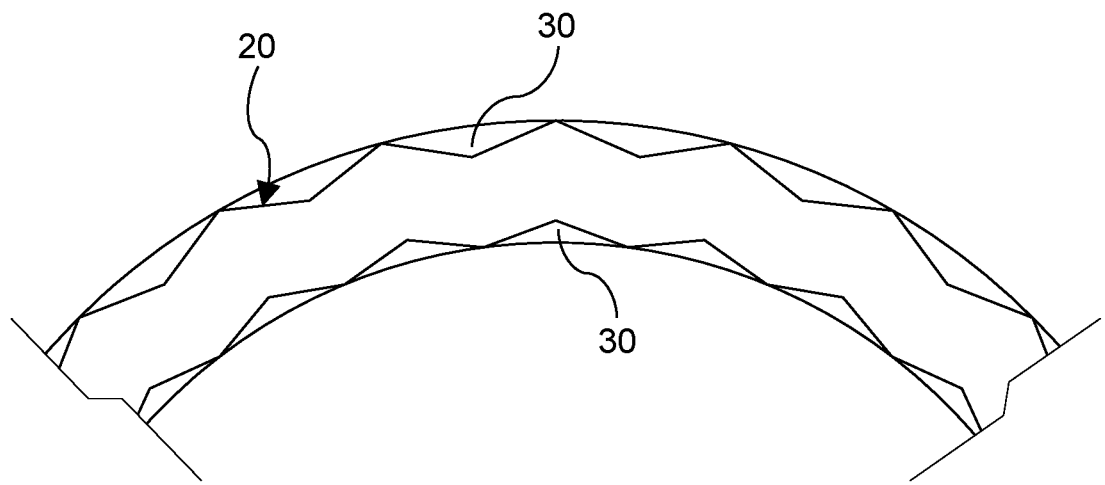
FIG. 4 is an axial end view of a portion of a periodic-wave disc brake rotor in accordance with another embodiment of the present invention.
Figure 5:
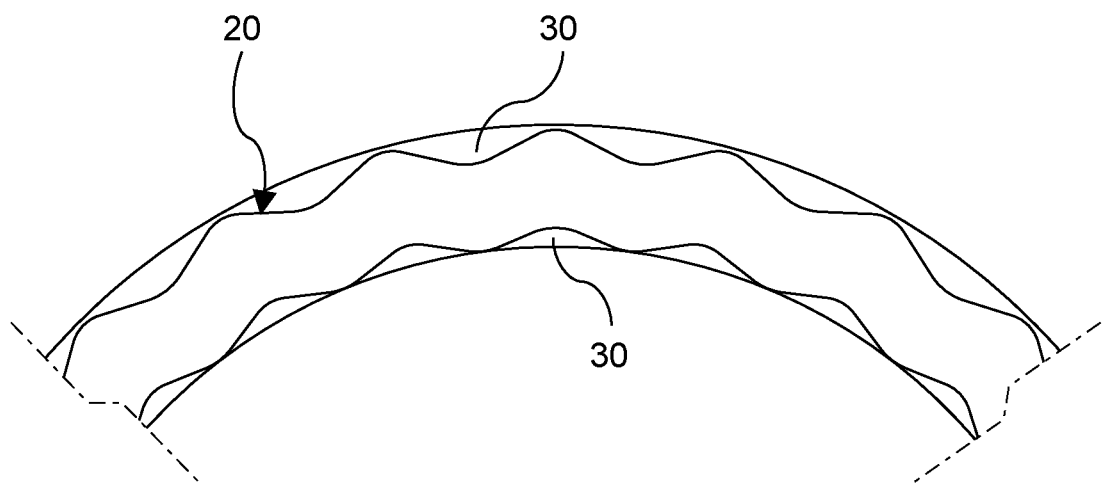
FIG. 5 is an axial end view of a portion of a periodic-wave disc brake rotor in accordance with still another embodiment of the present invention.

Annular portion 20 has two axial opposing surfaces, i.e., surface 22 visible in FIGS. 1-3 and surface 24 visible only in FIGS. 2 and 3. Opposing surfaces 22 and 24 will be engaged by a brake caliper (not shown) during a braking operation as would be understood by one of ordinary skill in the art. In accordance with the present invention, each of opposing surfaces 22 and 24 traverses a periodic wave around annular portion 20. In the illustrated embodiment, the periodic wave is a trapezoidal wave. However, the present invention is not so limited as the periodic wave presented by annular portion 20 could be triangular as shown in FIG. 4, sinusoidal as shown in FIG. 5, or any other periodic wave shape without departing from the scope of the present invention.

Referring again to FIGS. 1-3, an inner radial edge 26 and outer radial edge 28 of annular portion 20 also traverses a periodic wave. More specifically, inner radial edge 26 and outer radial edge 28 traverse periodic waves that have the same pattern and period as the periodic wave defining opposing surfaces 22 and 24. One or both of radial edges 26 and 28 can have thermal radiations elements 30 coupled to portions thereof. For example, in the illustrated embodiment, elements 30 are coupled to both radial edges 26 and 28 and extend between adjacent crests of the periodic wave defining edges 26 and 28. Elements 30 serve as radiators of heat generated at annular portion 20 during a braking operation. To reduce the weight of rotor 10 while still providing good thermal radiation, a ratio of t/T of 0.1 to 0.3 is maintained where T is the axial thickness of annular portion 20 between opposing surfaces 22 and 24, and t in the axial thickness of thermal radiation elements 30 as shown in FIGS. 2 and 3.

Figure 6:
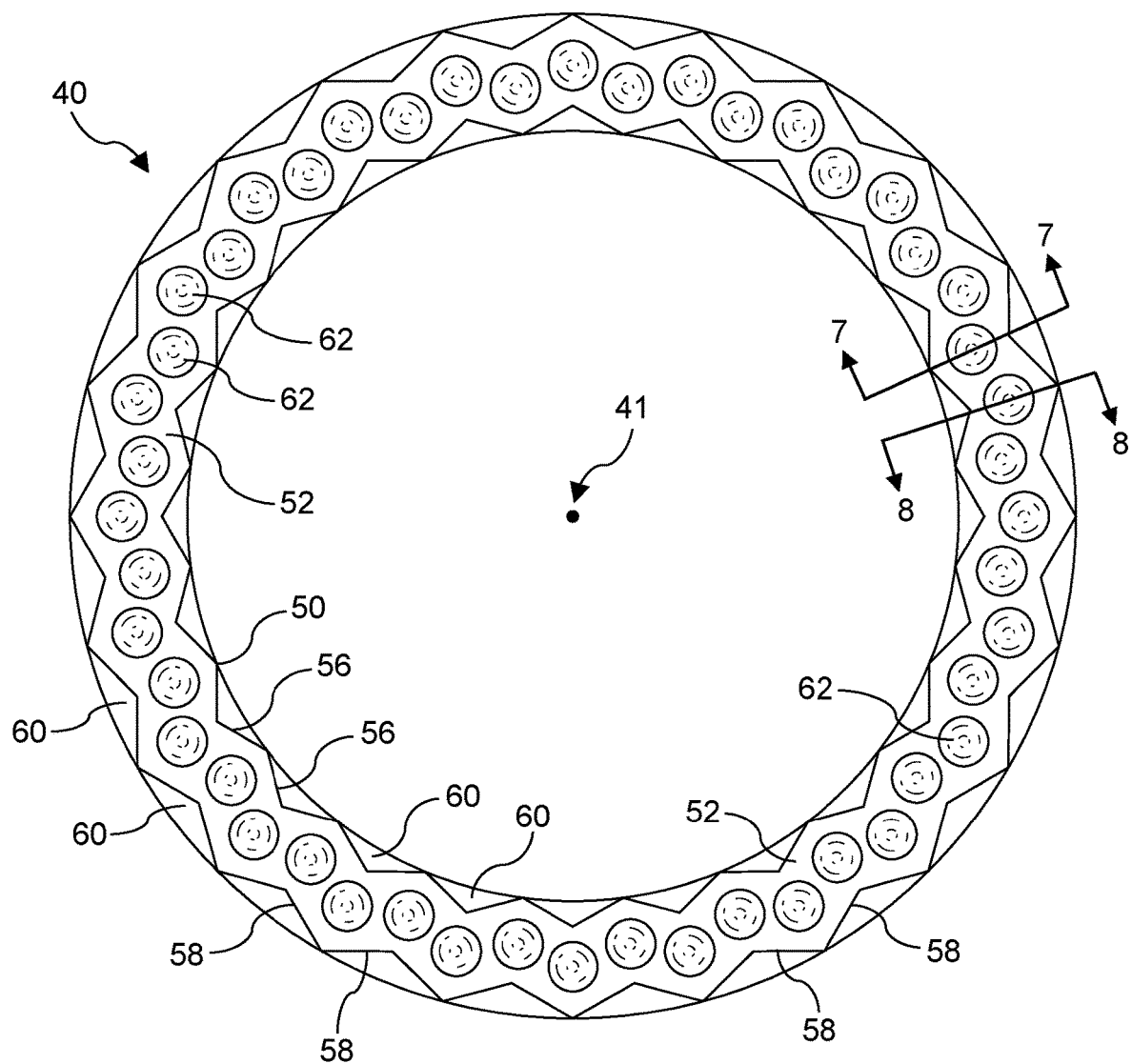
FIG. 6 is an axial end view of a circular dimpled periodic-wave disc brake rotor in accordance with another embodiment of the present invention.
Figure 7:
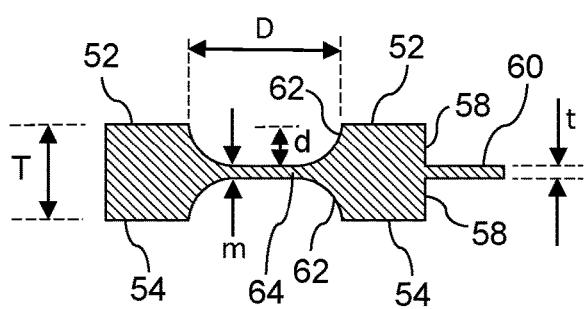
FIG. 7 is a radial cross-section of the disc brake rotor take along line 7-7 in FIG. 6.
Figure 8:
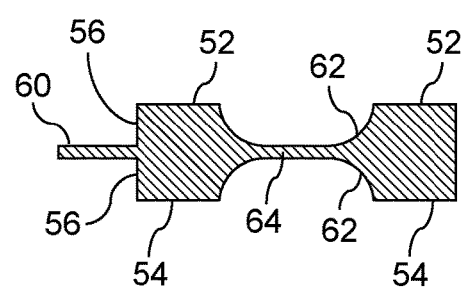
FIG. 8 is a radial cross-section of the disc brake rotor take along line 8-8 in FIG. 6.

The present invention can be further adapted to provide additional heat dissipation and weight reducing features. For example, and with simultaneous reference to FIGS. 6-8, a disc brake rotor in accordance with another embodiment is shown and is referenced generally by numeral 40 in FIG. 6. Similar to rotor 10 described above, FIG. 6 presents an axial end view of disc brake rotor 40 having an axis of rotation indicated by numeral 41. Rotor 40 includes an annular portion 50 defining opposing braking surfaces 52 and 54, and thermal radiation elements 60. Annular portion 50 traverses a triangular wave such that an inner radial edge 56 and outer radial edge 58 also traverse a triangular wave having the same pattern and period as the triangular wave defining opposing surfaces 52 and 54. Thermal radiation elements 60 can be coupled to one or both (as shown) of radial edges 56 and 58 between adjacent crests of the edges defining the periodic wave. Similar to rotor 10, the weight of rotor 40 is reduced by maintaining a ratio of t/T between 0.1 and 0.3 where T is the axial thickness of annular portion 50 between opposing surfaces 52 and 54, and t is the axial thickness of elements 60 as shown in FIGS. 7 and 8.

Rotor 40 additionally includes dimples 62 in one or both (as shown) of opposing surfaces 52 and 54. As will be explained further below, dimples 62 enhance convective, radiation, and conduction cooling effects of rotor 40. In the illustrated example, dimples 62 are circular dimples that are provided in both opposing surfaces 52 and 54. More specifically, each dimple 62 in surface 52 is aligned with a corresponding dimple 62 in surface 54 as illustrated in FIGS. 7 and 8 such that a rigid membrane or lamina 64 is defined between each corresponding pair of dimples 62. The combination of cooling effects and weight reduction is optimized when a ratio of dimple diameter D to its depth d (i.e., D/d) is in a range of 2 to 20, and when a ratio of an axial thickness m of lamina 64 at dimple depth d to axial thickness T (i.e., m/T) is in a range of 0.1 to 0.3.

Figure 9:
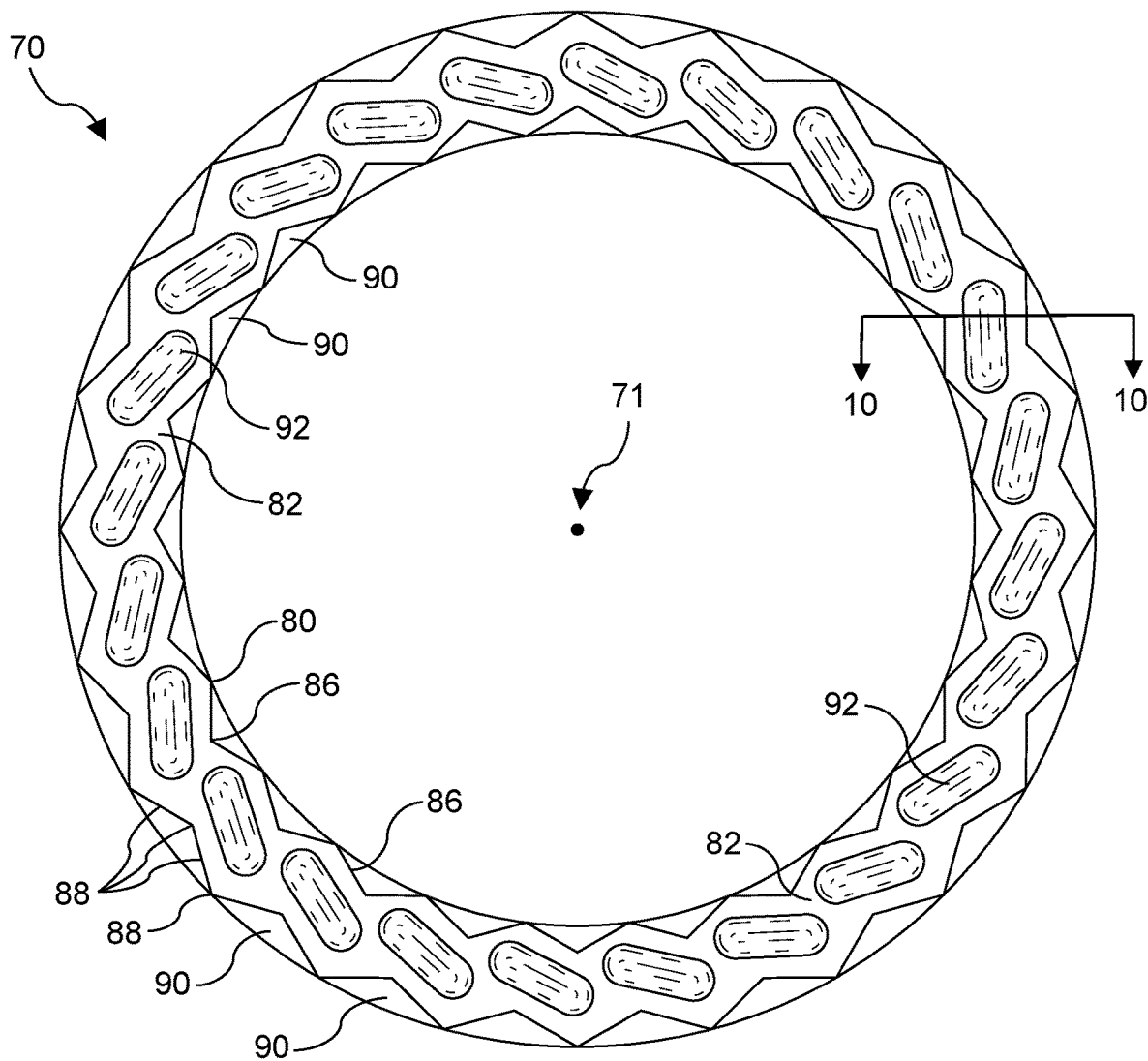
FIG. 9 is an axial end view of elongate-dimpled periodic-wave disc brake rotor in accordance with another embodiment of the present invention.

The present invention is not limited to use of circular dimples in one or both of the rotor's opposing braking surfaces. For example, and with simultaneous reference to FIGS. 9-10, a disc brake rotor in accordance with another embodiment of the present invention is shown and is referenced generally by numeral 70 in FIG. 9 where an axial end view of the rotor is illustrated. Rotor 70 includes an annular portion 80 defining opposing braking surfaces 82 and 84, and radial edges 86 and 88 where surfaces 82/84 and edges 86/88 traverse a periodic wave sharing a common pattern and period as in the previously-described embodiments. Thermal radiation elements 90 can be coupled to one or both (as shown) of radial edges 86 and 88 and can be governed by the same thickness ratio as in the previously-described embodiments.

Figure 10:
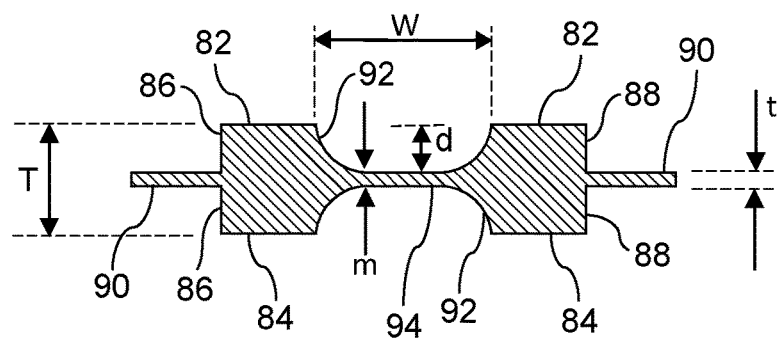
FIG. 10 is a cross-section of the disc brake rotor that spans the width of an elongate dimpled region of the rotor take along line 10-10 in FIG. 9.

Rotor 70 additionally includes elongated dimples 92 in one or both (as shown) of opposing surfaces 82 and 84. When provided in both opposing surfaces 82 and 84, each dimple 92 in surface 82 is aligned with a corresponding dimple 92 in surface 84 as illustrated in FIG. 10 such that a rigid membrane or lamina 94 is defined between each corresponding pair of dimples 92. The combination of cooling effects and weight reduction is optimized when a ratio of dimple width W to its depth d (i.e., W/d) is in a range of 2 to 20, and when a ratio of an axial thickness m of lamina 94 at dimple depth d to axial thickness T (i.e., m/T) is in a range of 0.1 to 0.3.

As mentioned above, the inclusion of dimples in rotors of the present invention improves the rotor's convective and conductive cooling effects. These effects will be explained with reference to FIG. 11 where an isolated cross-sectional view of a dimpled region of rotor constructed in accordance with the present invention is illustrated. While FIG. 11 depicts circular dimples 62 and corresponding lamina 64, it is to be understood that the principles to be described below also apply to elongate dimples. As air flow 100 moves over the braking surfaces 52/54, dimples 62 and the thin shared lamina 64 disrupt the laminar part of air flow 100 to create a turbulent flow 102 inside of dimples 62 to thereby enhance convective cooling. Lamina 64 also provides a conductive thermal path 200 within the rotor such that the conducted heat is dissipated by turbulent flow 102.

Dimpled embodiments of the present invention can also be adapted to provide enhanced radiative cooling. Referring now to FIG. 12, the exposed surfaces of dimples 62 are coated with a material 66 that has a high thermal emissivity values in a range of 0.3 to 0.99. Such materials can include, but are not limited to, any high temperature black paints or spray-on coatings under trade names such as Cerablak HTP, Acktar Black Coatings, and Aremco HiE-Coat 840-MS. Material 66 can also be a black anodized aluminum. The presence of material 66 enhances the radiative cooling effects indicated by wavy arrows 300.

The advantages of the present invention are numerous. The disc brake rotor of the present invention provides improved heat dissipation and can include a variety of weight reducing features. The features of the present invention are readily incorporated into either perimeter or hub-mounted disc brake rotors to greatly improve their viability in a variety of wheeled vehicle applications.

Although the invention has been described relative to a specific embodiment thereof, there are numerous variations and modifications that will be readily apparent to those skilled in the art in light of the above teachings. For example, through holes or slots can be provided in the thermal radiation elements to achieve additional weight reduction and to reduce a rotor's internal high temperature stress due to thermal-expansion, if needed. It is therefore to be understood that, within the scope of the appended claims, the invention may be practiced other than as specifically described.

What is claimed as new and desired to be secured by Letters Patent of the United States is:

1. A disc brake rotor, comprising:
an annular portion having a first surface and a second surface in opposition to said first surface, said annular portion having an axial thickness T between said first surface and said second surface, said first surface and said second surface traversing a periodic wave wherein an inner radial edge of said annular portion traverses an inner periodic wave and an outer radial edge of said annular portion traverses an outer periodic wave, and wherein a pattern and a period are the same for said periodic wave, said inner periodic wave, and said outer periodic wave; and
thermal radiation elements coupled to said inner radial edge between adjacent crests of said inner periodic wave and coupled to said outer radial edge between adjacent crests of said outer periodic wave.

2. A disc brake rotor as in claim 1, further comprising:
first dimples in said first surface;
second dimples in said second surface; and
each of said first dimples being aligned with a corresponding one of said second dimples wherein a lamina is defined there between.

3. A disc brake rotor as in claim 2, wherein said first dimples and said second dimples comprise circular dimples.

4. A disc brake rotor as in claim 3, wherein said circular dimples have a diameter D and a depth d, wherein said lamina has an axial thickness m at said depth d, wherein a ratio of D/d is in a range of 2 to 20, and wherein a ratio of m/T is in a range of 0.1 to 0.3.

5. A disc brake rotor as in claim 2, wherein said first dimples and said second dimples comprise elongated dimples.

6. A disc brake rotor as in claim 5, wherein said elongated dimples have a width W and a depth d, wherein said lamina has an axial thickness m at said depth d, wherein a ratio of W/d is in a range of 2 to 20, and wherein a ratio of m/T is in a range of 0.1 to 0.3.

7. A disc brake rotor as in claim 1, wherein at least one of said first surface and said second surface includes dimples.

8. A disc brake rotor as in claim 7, further comprising a material coating surfaces of said dimples wherein said material has a thermal emissivity value in a range of 0.30 to 0.99.

9. A disc brake rotor as in claim 1, wherein said thermal radiation elements have an axial thickness t, and wherein a ratio of t/T is in a range of 0.1 to 0.3.

10. A disc brake rotor, comprising:
an annular portion having a first surface and a second surface in opposition to said first surface, said annular portion having an axial thickness T between said first surface and said second surface, said first surface and said second surface traversing a periodic wave wherein an inner radial edge of said annular portion traverses an inner periodic wave and an outer radial edge of said annular portion traverses an outer periodic wave, and wherein a pattern and a period are the same for said periodic wave, said inner periodic wave, and said outer periodic wave;
thermal radiation elements coupled to said inner radial edge between adjacent crests of said inner periodic wave and coupled to said outer radial edge between adjacent crests of said outer periodic wave, said thermal radiation elements having an axial thickness t, and wherein a ratio of t/T is in a range of 0.1 to 0.3; and
at least one of said first surface and said second surface includes dimples.

11. A disc brake rotor as in claim 10, wherein said dimples comprise:
first dimples in said first surface;
second dimples in said second surface; and
each of said first dimples being aligned with a corresponding one of said second dimples wherein a lamina is defined there between.

12. A disc brake rotor as in claim 11, wherein said first dimples and said second dimples comprise circular dimples.

13. A disc brake rotor as in claim 12, wherein said circular dimples have a diameter D and a depth d, wherein said lamina has an axial thickness m at said depth d, wherein a ratio of W/d is in a range of 2 to 20, and wherein a ratio of m/T is in a range of 0.1 to 0.3.

14. A disc brake rotor as in claim 11, wherein said first dimples and said second dimples comprise elongated dimples.

15. A disc brake rotor as in claim 14, wherein said elongated dimples have a width W and a depth d, wherein said lamina has an axial thickness m at said depth d, wherein a ratio of D/d is in a range of 2 to 20, and wherein a ratio of m/T is in a range of 0.1 to 0.3.

16. A disc brake rotor as in claim 11, further comprising a material coating surfaces of said dimples wherein said material has a thermal emissivity value in a range of 0.30 to 0.99.

* * * * *